(12) United States Patent
Lin et al.

(10) Patent No.: US 8,773,538 B2
(45) Date of Patent: Jul. 8, 2014

(54) CALIBRATION METHOD AND APPARATUS FOR OPTICAL IMAGING LENS SYSTEM WITH DOUBLE OPTICAL PATHS

(75) Inventors: En Ping Lin, Taichung (TW); Shing Chia Chen, Taichung (TW); Min Che Li, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 66 days.

(21) Appl. No.: 13/080,277

(22) Filed: Apr. 5, 2011

(65) Prior Publication Data

US 2012/0147196 A1    Jun. 14, 2012

(30) Foreign Application Priority Data

Dec. 8, 2010    (TW) ................. 99142767 A

(51) Int. Cl.
| | |
|---|---|
| H04N 17/02 | (2006.01) |
| H04N 13/02 | (2006.01) |
| H04N 17/00 | (2006.01) |
| G02B 26/04 | (2006.01) |
| G02B 5/08 | (2006.01) |
| H04N 5/357 | (2011.01) |
| H04N 13/00 | (2006.01) |

(52) U.S. Cl.
CPC .............. G02B 5/08 (2013.01); H04N 13/0246 (2013.01); H04N 17/002 (2013.01); H04N 13/021 (2013.01); G02B 26/04 (2013.01); H04N 5/3572 (2013.01); H04N 13/0025 (2013.01)
USPC ............................. 348/187; 348/42; 359/642

(58) Field of Classification Search
USPC ....................................... 348/42, 46, 49, 187
See application file for complete search history.

(56) References Cited

U.S. PATENT DOCUMENTS

| | | | | |
|---|---|---|---|---|
| 2002/0051639 | A1* | 5/2002 | Enomoto | 396/311 |
| 2004/0145814 | A1* | 7/2004 | Rogers | 359/634 |
| 2005/0174449 | A1* | 8/2005 | Matsuzaka | 348/240.3 |
| 2007/0091272 | A1* | 4/2007 | Lerner et al. | 353/31 |
| 2009/0015917 | A1* | 1/2009 | Iwamoto et al. | 359/462 |
| 2011/0249175 | A1* | 10/2011 | Lo | 348/362 |

FOREIGN PATENT DOCUMENTS

| | | |
|---|---|---|
| CN | 1655592 A | 8/2005 |
| CN | 1764231 B | 7/2010 |

OTHER PUBLICATIONS

Weng et al., Camera Calibration with Distortion Models and Accuracy Evaluation, 1992, IEEE Transactions on Pattern Analysis and Machine Intelligence, vol. 14, No. 10.

\* cited by examiner

*Primary Examiner* — Jefferey Harold
*Assistant Examiner* — Justin Sanders
(74) *Attorney, Agent, or Firm* — Morris, Manning & Martin, LLP; Tim Tingkang Xia, Esq.

(57) ABSTRACT

This invention provides a calibration method and a corresponding apparatus for optical imaging lens system with double optical paths. The apparatus for optical imaging lens system with double optical paths comprises a first optical subsystem, a second optical subsystem and a calibration module. The calibration module receives a first image data from the first optical subsystem and a second image data from the second optical subsystem. The calibration module calibrates the first image data according to at least one selected optical parameter of the second optical subsystem, and calibrates the second image data according to at least one selected optical parameter of the first optical subsystem. The selected optical parameters of the first optical subsystem and the second optical subsystem are different.

6 Claims, 12 Drawing Sheets

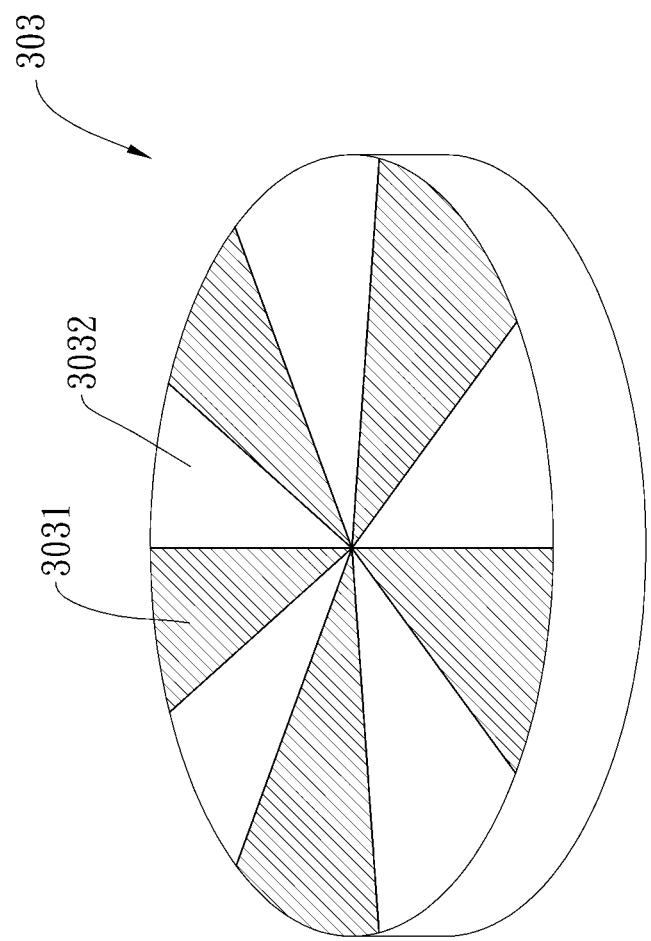

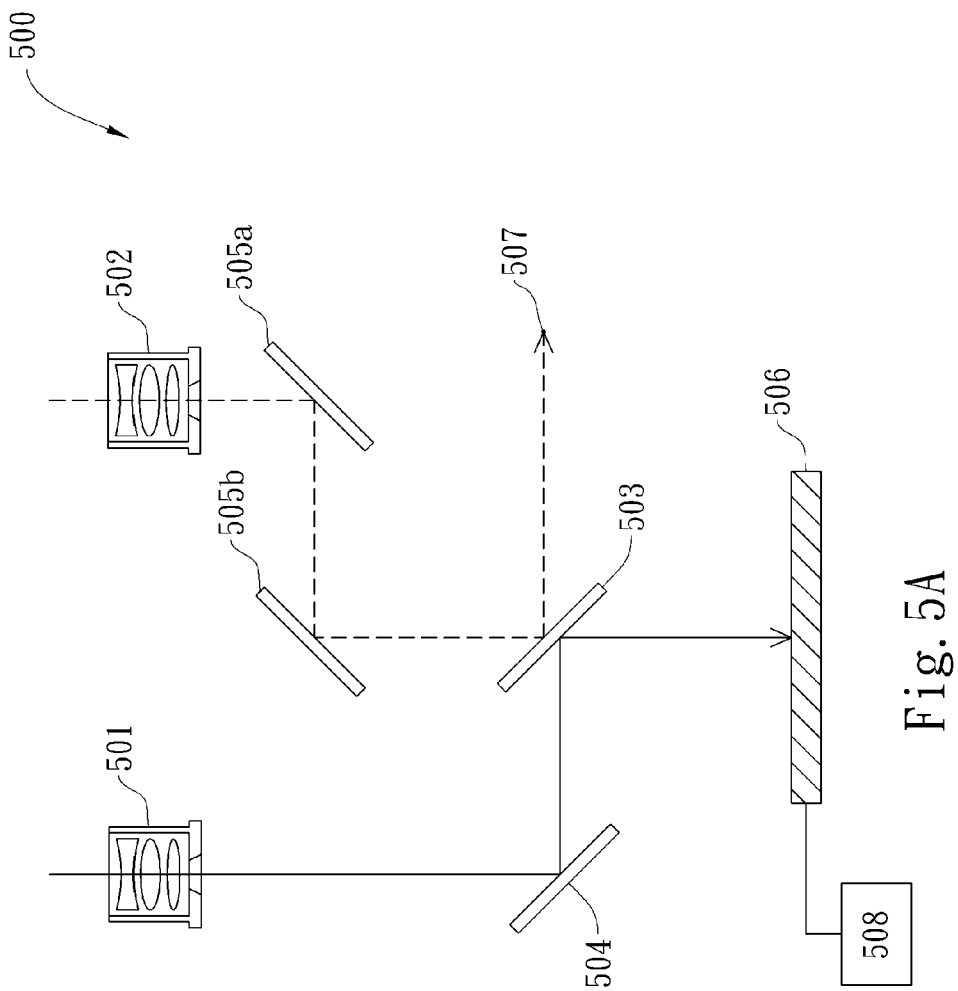

CALIBRATION METHOD AND APPARATUS FOR OPTICAL IMAGING LENS SYSTEM WITH DOUBLE OPTICAL PATHS

CROSS-REFERENCE TO RELATED APPLICATION

This non-provisional application claims priority under 35 U.S.C. §119(a) on Patent Application No. 099142767 filed in Taiwan, R.O.C. on Dec. 8, 2010, the entire contents of which are hereby incorporated by reference.

BACKGROUND OF THE INVENTION

1. Field of the Invention

The present invention relates to a calibration method and a corresponding apparatus for optical imaging lens system with double optical paths, and more particularly, to a calibration method for optical imaging lens system with double optical paths which is able to calibrate images coming from different optical systems.

2. Description of the Prior Art

Calibration of cameras, especially the calibration of distortion, has been considered as an important issue in aerial photographic measurement and machine vision system (MVS). The article entitled "Camera Calibration with Distortion Models and Accuracy Evaluation" (Juyan Weng, IEEE TRANSACTION ON PATTERN ANALYSIS AND MACHINE INTELLIGENCE VOL. 14 NO. 10 OCTOBER 1992) proposes a number of methods for calibrating distortions. However, as cameras are widely used, commercially and industrially, it will be insufficient to simply calibrate the distortions. Improving uniformity in images generated by different cameras is also required. Therefore, there is a demand for a method which is able to correct image non-uniformity caused by differences among various components produced in massive quantities.

As an optical system comprises a number of precise optical components, one optical system will be different from anther in optical parameters, such as lateral magnification, contrast, image surface illumination and distortion, due to the subtle differences in the size of the individual components thereof. The characteristics of different batches of sensors vary slightly as well. Non-uniform images displayed continuously at a high speed will cause much discomfort for the average viewers.

Therefore, a need exists in the art for a method which can effectively calibrate non-uniformity in images generated by different optical lenses.

SUMMARY OF THE INVENTION

An object of the present invention is to calibrate the differences between two optical systems caused during the manufacturing process so that the output images will not be affected by such differences. Consequently, uniformity in images can be improved.

To achieve the above object, the present invention provides a calibration apparatus for optical imaging lens system with double optical paths, comprising: a first optical subsystem; a second optical subsystem having a back focal length equal to that of the first optical subsystem; an optical path selector selectively having a light reflection state and a light passing state; a first reflector set disposed at an image side of the first optical subsystem for directing the light from the first optical subsystem to the optical path selector; a second reflector set disposed at an image side of the second optical subsystem for directing the light from the second optical subsystem to the optical path selector; a sensor for obtaining a first image data from an image coming from the first optical subsystem and a second image data from an image coming from the second optical subsystem; and a calibration module for receiving the first image data and the second image data from the sensor, the calibration module calibrating the first image data according to at least one selected optical parameter of the second optical subsystem and calibrating the second image data according to at least one selected optical parameter of the first optical subsystem, the selected optical parameters of the first optical subsystem and the second optical subsystem being different; wherein when the optical path selector is in the light reflection state, the light from the first optical subsystem forms an image on the sensor while the light from the second optical subsystem forms an image on another position rather than on the sensor; and wherein when the optical path selector is in the light passing state, the light from the second optical subsystem forms an image on the sensor while the light from the first optical subsystem forms an image on another position rather than on the sensor.

The present invention provides another calibration apparatus for optical imaging lens system with double optical paths, comprising: a first optical subsystem; a second optical subsystem having a back focal length equal to that of the first optical subsystem; a reflector set disposed at the image sides of the first optical subsystem and the second optical subsystem for directing the light from the first optical subsystem and the light from the second optical subsystem, so that an optical path of the first optical subsystem intersects with an optical path of the second optical subsystem; a movable optical path selector for reflecting either the light from the first optical subsystem or the light from the second optical subsystem; a sensor for obtaining a first image data from an image coming from the first optical subsystem and a second image data from an image coming from the second optical subsystem; and a calibration module for receiving the first image data and the second image data from the sensor, the calibration module calibrating the first image data according to at least one selected optical parameter of the second optical subsystem and calibrating the second image data according to at least one selected optical parameter of the first optical subsystem, the selected optical parameters of the first optical subsystem and the second optical subsystem being different; wherein when the movable optical path selector is disposed at a position where the optical path of the first optical subsystem and the optical path of the second optical subsystem intersect, the light from the first optical subsystem forms an image on the sensor while the light from the second optical subsystem forms an image on another position rather than on the sensor; and wherein when the movable optical path selector is disposed at the position other than the optical path of the first optical subsystem, the optical path of the second optical subsystem, or the intersection of the two optical paths, the light from the second optical subsystem forms an image on the sensor while the light from the first optical subsystem forms an image on another position rather than on the sensor.

The present invention provides another calibration apparatus for optical imaging lens system with double optical paths, comprising: a first optical system; a second optical system having a back focal length equal to that of the first optical system; a first sensor for obtaining a first image data from an image coming from the first optical system; a second sensor for obtaining a second image data from an image coming from the second optical system; and a calibration module for receiving the first image data and the second image data from the first sensor and the second sensor, the calibration module calibrating the first image data according to at least one selected optical parameter of the second optical system and calibrating the second image data according to at least one selected optical parameter of the first optical system, the selected optical parameters of the first optical system and the second optical system being different.

The present invention provides a calibration method for optical imaging lens system with double optical paths comprising the steps of: receiving a first image data from a first optical subsystem and a second image data from a second optical subsystem; calibrating the first image data according to at least one selected optical parameter of the second optical subsystem; and calibrating the second image data according to at least one selected optical parameter of the first optical subsystem.

With the aforementioned calibration method and apparatus for optical imaging lens system with double optical paths, uniformity in images generated by different optical systems or optical subsystems can be improved.

BRIEF DESCRIPTION OF THE DRAWINGS

FIG. 3 illustrates an alternative example of the optical path selector in a calibration apparatus for optical imaging lens system with double optical paths according to the first embodiment of the present invention.

FIG. 5A illustrates a schematic view showing a calibration apparatus for optical imaging lens system with double optical paths according to a second embodiment of the present invention, wherein an image coming from the first optical subsystem is recorded.

DETAILED DESCRIPTION OF THE PREFERRED EMBODIMENTS

The present invention now will be described more fully hereinafter with reference to the accompanying drawings, in which preferred embodiments of the present invention are shown.

Figure 1A:
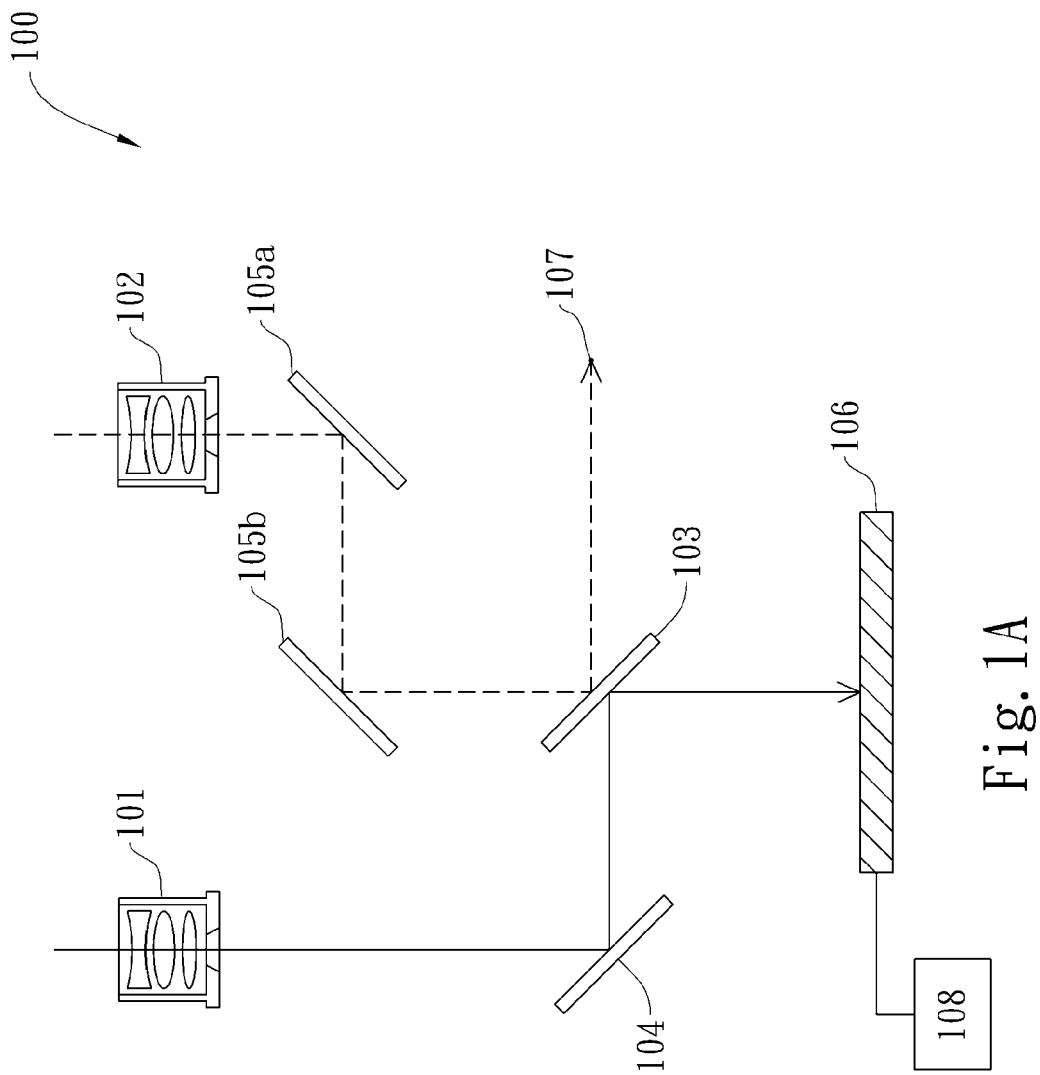
FIG. 1A illustrates a schematic view showing a calibration apparatus for optical imaging lens system with double optical paths according to a first embodiment of the present invention, wherein an image coming from the first optical subsystem is recorded.
Figure 1B:
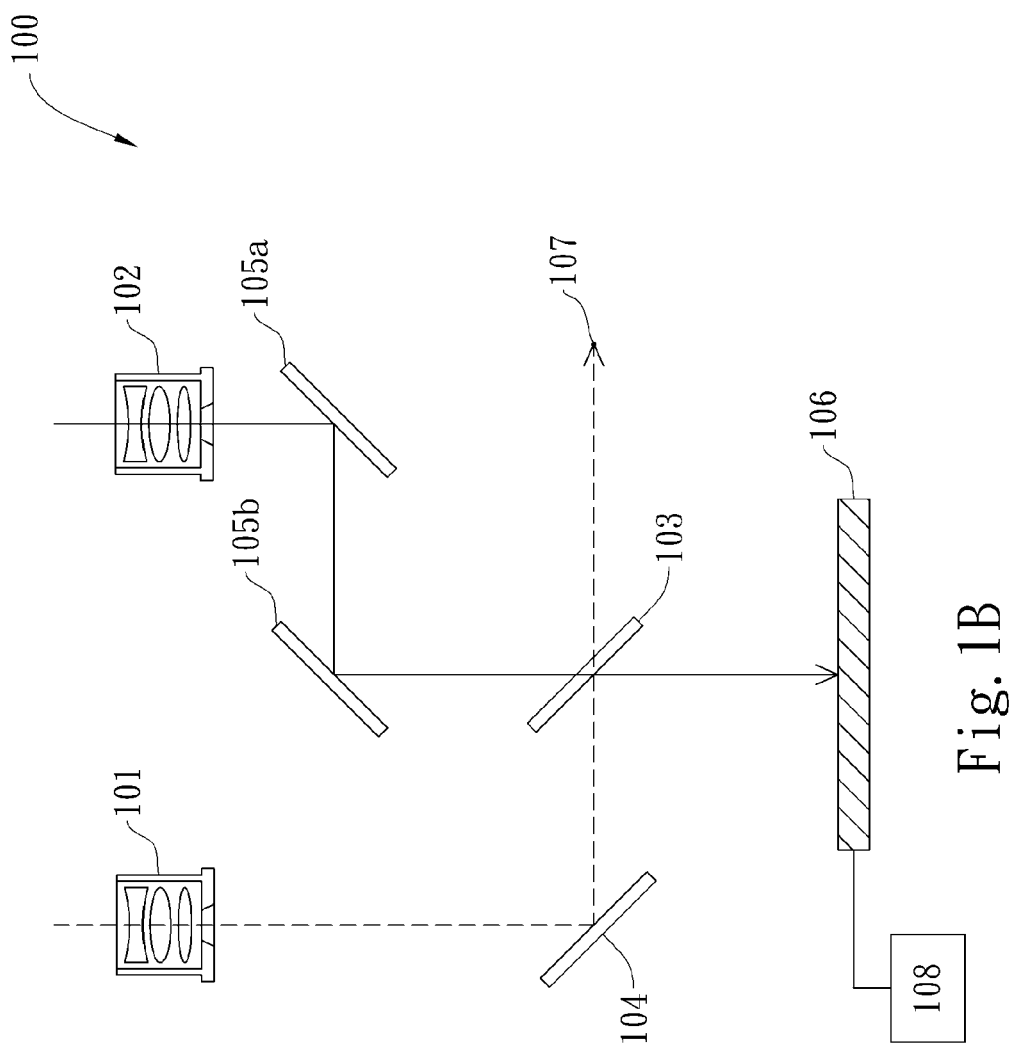
FIG. 1B illustrates a schematic view showing a calibration apparatus for optical imaging lens system with double optical paths according to the first embodiment of the present invention, wherein an image coming from the second optical subsystem is recorded.

FIG. 1A illustrates a schematic view showing a calibration apparatus 100 for optical imaging lens system with double optical paths according to a first embodiment of the present invention, wherein an image coming from the first optical subsystem is recorded. FIG. 1B illustrates the calibration apparatus 100 according to the same embodiment of the present invention, wherein an image coming from the second optical subsystem is recorded. In this embodiment, the calibration apparatus 100 for optical imaging lens system with double optical paths comprises a first optical subsystem 101, a second optical subsystem 102, an optical path selector 103, a first reflector set 104, a second reflector set 105 comprising two reflectors 105a and 105b, a sensor 106, and a calibration module 108. By a proper configuration of the first reflector set 104, the second reflector set 105 comprising two reflectors 105a and 105b and the optical path selector 103, the present invention enables a first image coming from the first optical subsystem 101 and a second image coming from the second optical subsystem 102 to be recorded on the sensor 106 in a sequential or alternating order. The sensor 106 outputs a first image data and a second image data according to the first image and the second image. The calibration module 108 receives the first image data and the second image data output by the sensor 106 and calibrates the first image data and the second image data to improve uniformity in images.

The first optical subsystem 101 and the second optical subsystem 102 may be optical systems with conventional imaging lenses; they are used for receiving the light coming from an object (not shown) to be imaged. The first reflector set 104 comprising one reflector is disposed at the image side of the first optical subsystem 101 for directing the light from the first optical subsystem 101 to the optical path selector 103. The second reflector set 105 comprising two reflectors 105a and 105b is disposed at the image side of the second optical subsystem 102 for directing the light from the second optical subsystem 102 to the optical path selector 103. The optical path selector 103 comprises a liquid crystal element having at least liquid crystal molecules and two electrode plates. By selecting the types of liquid crystal molecules and the voltage applied to them, the optical path selector 103 can be controlled to let light pass through or reflect. In the first embodiment of the present invention, when the optical path selector 103 is in the light reflection state, the light from the first optical subsystem 101 is reflected by the optical path selector 103 and forms an image on the sensor 106; meanwhile, the light from the second optical subsystem 102 is reflected by the optical path selector 103 and forms an image on another position 107 rather than on the sensor 106. When the optical path selector 103 is in the light passing state, the light from the second optical subsystem 102 passes through the optical path selector 103 and forms an image on the sensor 106; meanwhile, the light from the first optical subsystem 101 passes through the optical path selector 103 and forms an image on another position 107 rather than on the sensor 106.

FIG. 1A illustrates a schematic view showing a calibration apparatus for optical imaging lens system with double optical paths according to the first embodiment of the present invention, wherein an image coming from the first optical subsystem 101 is recorded. In FIG. 1A, the optical path of the first optical subsystem 101 is shown in solid lines, while the optical path of the second optical subsystem 102 is shown in dashed lines; the optical path selector 103 is in the light reflection state. After the first optical subsystem 101 receives the light from an object (not shown) to be imaged, the light from the first optical subsystem 101 is reflected by the first reflector set 104 and directed to the optical path selector 103; since the optical path selector 103 is in the light reflection state, the light from the first optical subsystem 101 is further reflected by the optical path selector 103, directed to the sensor 106 and forms a first image thereon. The first image is recorded on the sensor 106 upon its formation.

On the other hand, after the second optical subsystem 102 receives the light from an object (not shown) to be imaged, the light from the second optical subsystem 102 is reflected by the second reflector set 105 comprising two reflectors 105a and 105b and then directed to the optical path selector 103; since the optical path selector 103 is in the light reflection state, the light from the second optical subsystem 102 is further reflected by the optical path selector 103, directed to another position 107 and forms an image thereon rather than on the sensor 106.

FIG. 1B illustrates a schematic view showing a calibration apparatus for optical imaging lens system with double optical paths according to the first embodiment of the present invention, wherein an image coming from the second optical subsystem 102 is recorded. In FIG. 1B, the optical path of the first optical subsystem 101 is shown in dashed lines, while the optical path of the second optical subsystem 102 is shown in solid lines; the optical path selector 103 is in the light passing state. After the second optical subsystem 102 receives the light from an object (not shown) to be imaged, the light from the second optical subsystem 102 is reflected by the second reflector set 105 (comprising two reflectors 105a and 105b) and directed to the optical path selector 103; since the optical path selector 103 is in the light passing state, the light from the second optical subsystem 102 passes through it and forms a second image on the sensor 106. The second image is recorded on the sensor 106 upon its formation.

On the other hand, after the first optical subsystem 101 receives the light from an object (not shown) to be imaged, the light from the first optical subsystem 101 is reflected by the first reflector set 104 and then directed to the optical path selector 103; since the optical path selector 103 is in the light passing state, the light from the first optical subsystem 101 passes through it and forms an image on another position 107 rather than on the sensor 106.

Figure 2:
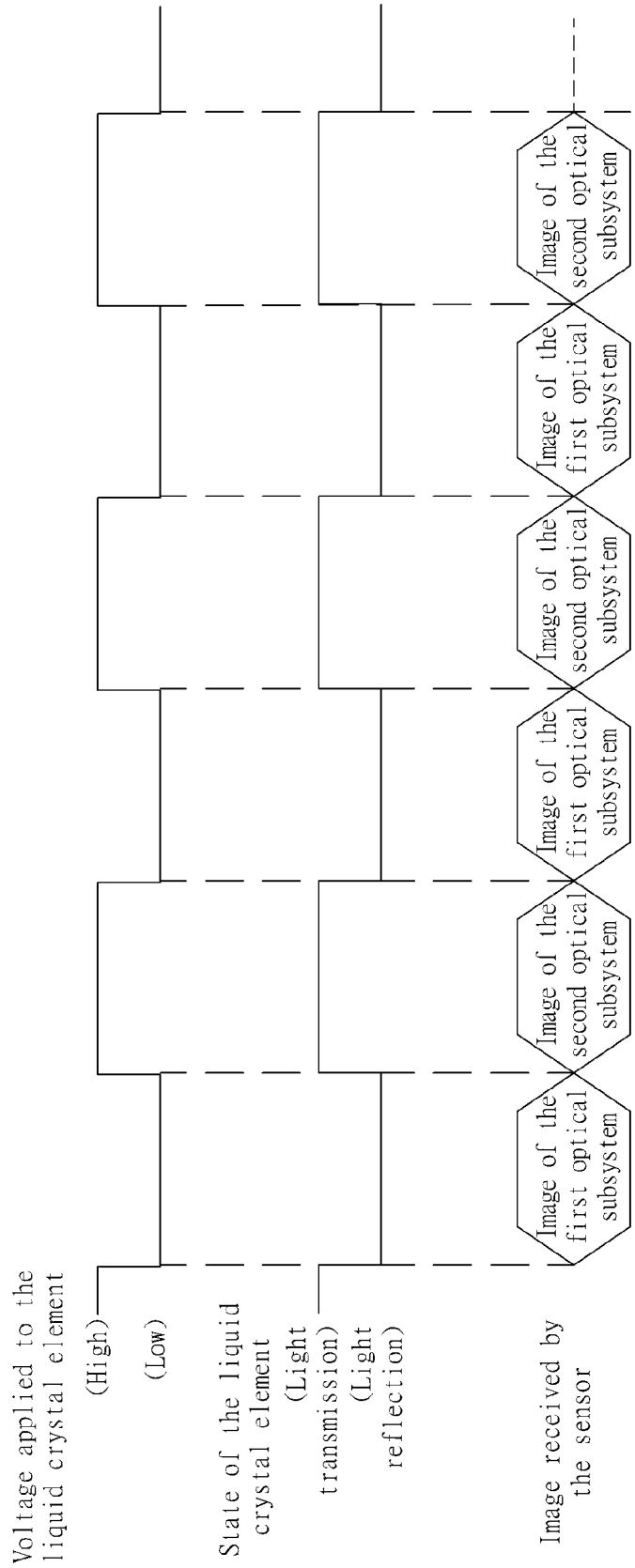
FIG. 2 illustrates a timeline chart showing the state that each component of a calibration apparatus for optical imaging lens system with double optical paths is according to the first embodiment of the present invention.

It can be seen from the above that, the first optical subsystem 101 and the second optical subsystem 102 of a calibration apparatus for optical imaging lens system with double optical paths according to the present invention have equal back focal lengths, so that the light from both the first optical subsystem 101 and the second optical subsystem 102 can form clear images on the sensor 106. FIG. 2 illustrates a timeline chart showing the state that each component of the calibration apparatus 100 for optical imaging lens system with double optical paths is according to the first embodiment of the present invention. As described above, by controlling the voltage applied to it, the optical path selector 103 can let light pass through or reflect light. In the first embodiment, the optical path selector 103 will be in the light passing state when a high voltage is applied thereto; the optical path selector 103 will be in the light reflection state when a low voltage is applied thereto. The calibration apparatus 100 for optical imaging lens system with double optical paths of the present invention further comprises a control unit (not shown), which controls whether a high or low voltage is applied to the optical path selector 103. With reference to FIGS. 1A and 1B, in the first embodiment, when a low voltage is applied to the optical path selector 103, the optical path selector 103 will be in the light reflection state; as a result, the sensor 106 receives a first image that comes from the first optical subsystem 101. And when a high voltage is applied to the optical path selector 103, the optical path selector 103 will be in the light passing state; as a result, the sensor 106 receives a second image that comes from the second optical subsystem 102. By synchronizing the cycle that the optical path selector 103 changes its optical state and the cycle that the sensor 106 is exposed to light, a calibration apparatus for optical imaging lens system with double optical paths of the present invention enables an image coming from the first optical subsystem 101 and an image coming from the second optical subsystem 102 to be alternately recorded on the sensor 106 in a sequential order. It should be noted that alternatively, by using other types of liquid crystal molecules, a low voltage applied to the optical path selector 103 could cause light to pass through the optical path selector 103, and a high voltage applied to the optical path selector 103 could cause light to be reflected by the optical path selector 103.

From the above, it is known that the optical path selector 103 may be any device which has a light passing state and a light reflection state. FIG. 3 illustrates an alternative example of the optical path selector 103 in the calibration apparatus for optical imaging lens system with double optical paths according to the first embodiment of the present invention. The optical path selector 103 comprises a disk 303. The disk 303 has five light reflection areas 3031 and five light passing areas 3032, each light reflection area 3031 and each light passing area 3032 being arranged alternately. By rotating the disk 303, light can either pass through the disk 303 or be reflected by it. The light reflection areas 3031 may be mirrors or areas made of reflective materials, and the light passing areas 3032 may be hollowed out areas or made of materials that permit light to pass therethrough.

Figure 4A:
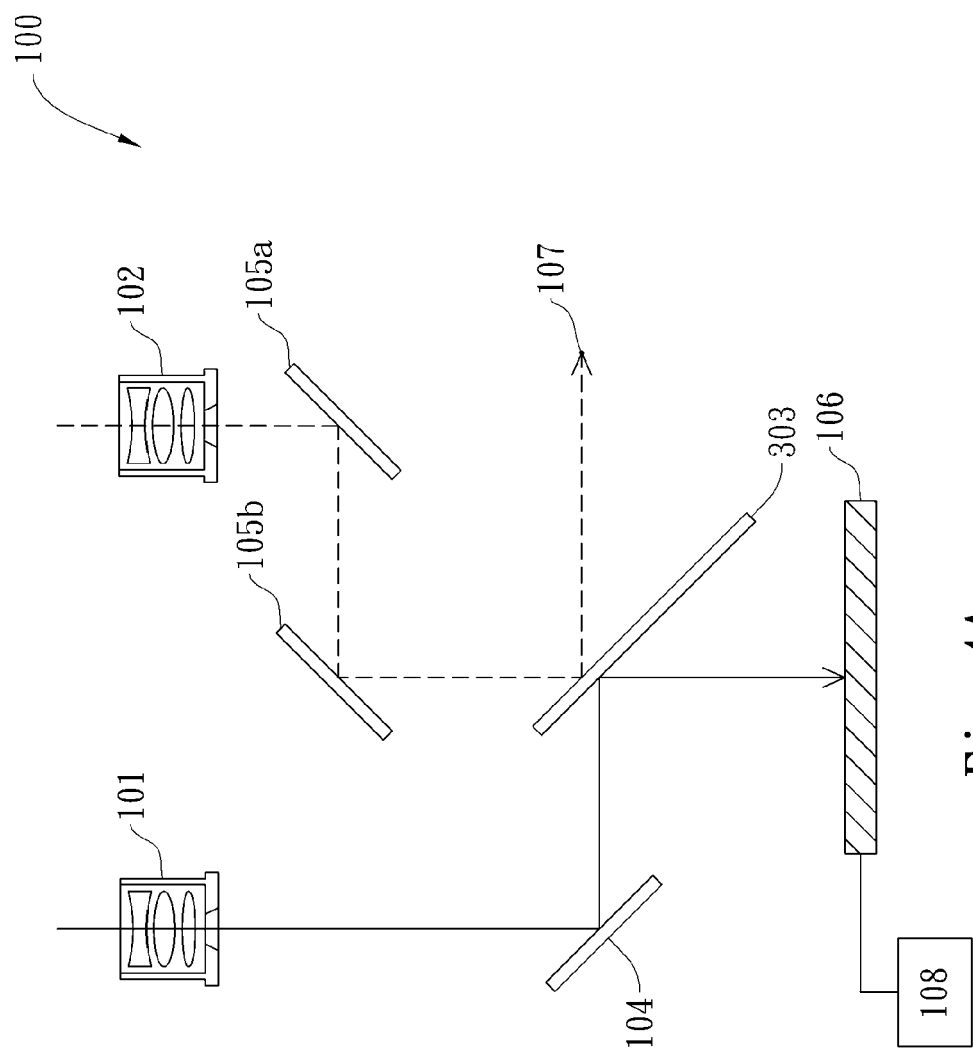
FIG. 4A illustrates a schematic view showing a calibration apparatus for optical imaging lens system with double optical paths according to an alternative example of the first embodiment of the present invention, wherein an image coming from the first optical subsystem is recorded.
Figure 4B:
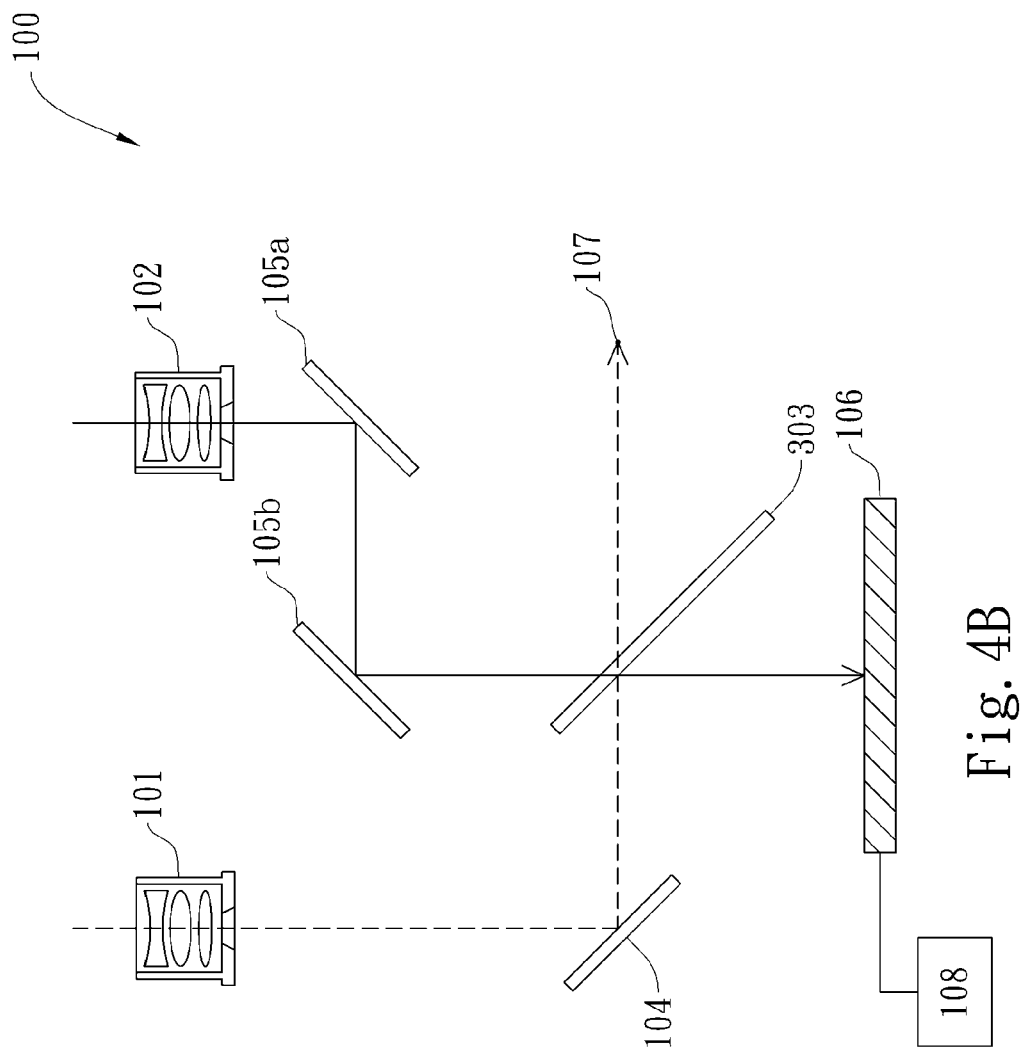
FIG. 4B illustrates a schematic view showing a calibration apparatus for optical imaging lens system with double optical paths according to an alternative example of the first embodiment of the present invention, wherein an image coming from the second optical subsystem is recorded.

FIG. 4A illustrates a schematic view showing a calibration apparatus 100 for optical imaging lens system with double optical paths according to an alternative example of the first embodiment of the present invention, wherein an image coming from the first optical subsystem 101 is recorded. FIG. 4B illustrates a schematic view showing a calibration apparatus 100 for optical imaging lens system with double optical paths according to an alternative example of the first embodiment of the present invention, wherein an image coming from the second optical subsystem 102 is recorded. In FIG. 4A, the optical path of the first optical subsystem 101 is shown in solid lines, while the optical path of the second optical subsystem 102 is shown in dashed lines. One of the light reflection areas 3031 of the disk 303 is rotated to be placed at the position where the optical path of the first optical subsystem 101 and the optical path of the second optical subsystem 102 intersect; that is, the disk 303 is in the light reflection state.

After the first optical subsystem 101 receives the light from an object (not shown) to be imaged, the light from the first optical subsystem 101 is reflected by the first reflector set 104 and directed to the disk 303; since the disk 303 is in the light reflection state, the light from the first optical subsystem 101 is further reflected by the disk 303, directed to the sensor 106 and forms a first image thereon. The first image is recorded on the sensor 106 upon its formation.

On the other hand, after the second optical subsystem 102 receives the light from an object (not shown) to be imaged, the light from the second optical subsystem 102 is reflected by the second reflector set 105 (comprising two reflectors 105a and 105b) and directed to the disk 303; since the disk 303 is in the light reflection state, the light from the second optical subsystem 102 is further reflected by the disk 303, directed to another position 107 and forms an image thereon rather than on the sensor 106.

FIG. 4B illustrates a schematic view showing a calibration apparatus 100 for optical imaging lens system with double optical paths according to an alternative example of the first embodiment of the present invention, wherein an image coming from the second optical subsystem 102 is recorded. In FIG. 4B, the optical path of the first optical subsystem 101 is shown in dashed lines, while the optical path of the second optical subsystem 102 is shown in solid lines. One of the light passing areas 3032 of the disk 303 is rotated to be placed at the position where the optical path of the first optical subsystem 101 and the optical path of the second optical subsystem 102 intersect; that is, the disk 303 is in the light passing state. After the second optical subsystem 102 receives the light from an object (not shown) to be imaged, the light from the second optical subsystem 102 is reflected by the second reflector set 105 (comprising two reflectors 105a and 105b) and directed to the disk 303; since the disk 303 is in the light passing state, the light from second optical subsystem 102 passes through the disk 303 and forms a second image on the sensor 106. The second image is recorded on the sensor 106 upon its formation.

On the other hand, after the first optical subsystem 101 receives the light from an object (not shown) to be imaged, the light from the first optical subsystem 101 is reflected by the first reflector set 104 and directed to the disk 303; since the disk 303 is in the light passing state, the light from the first optical subsystem 101 passes through the disk 303 and forms an image on another position 107 rather than on the sensor 106. The cycle that the disk 303 changes its state for light passing or blocking and the cycle that the sensor 106 is exposed to light can be synchronized by adjusting the angular velocity of the disk 303. By synchronizing the cycles of the states, an image coming from the first optical subsystem 101 and an image coming from the second optical subsystem 102 can be alternately recorded on the sensor 106 in a sequential order.

Figure 7:
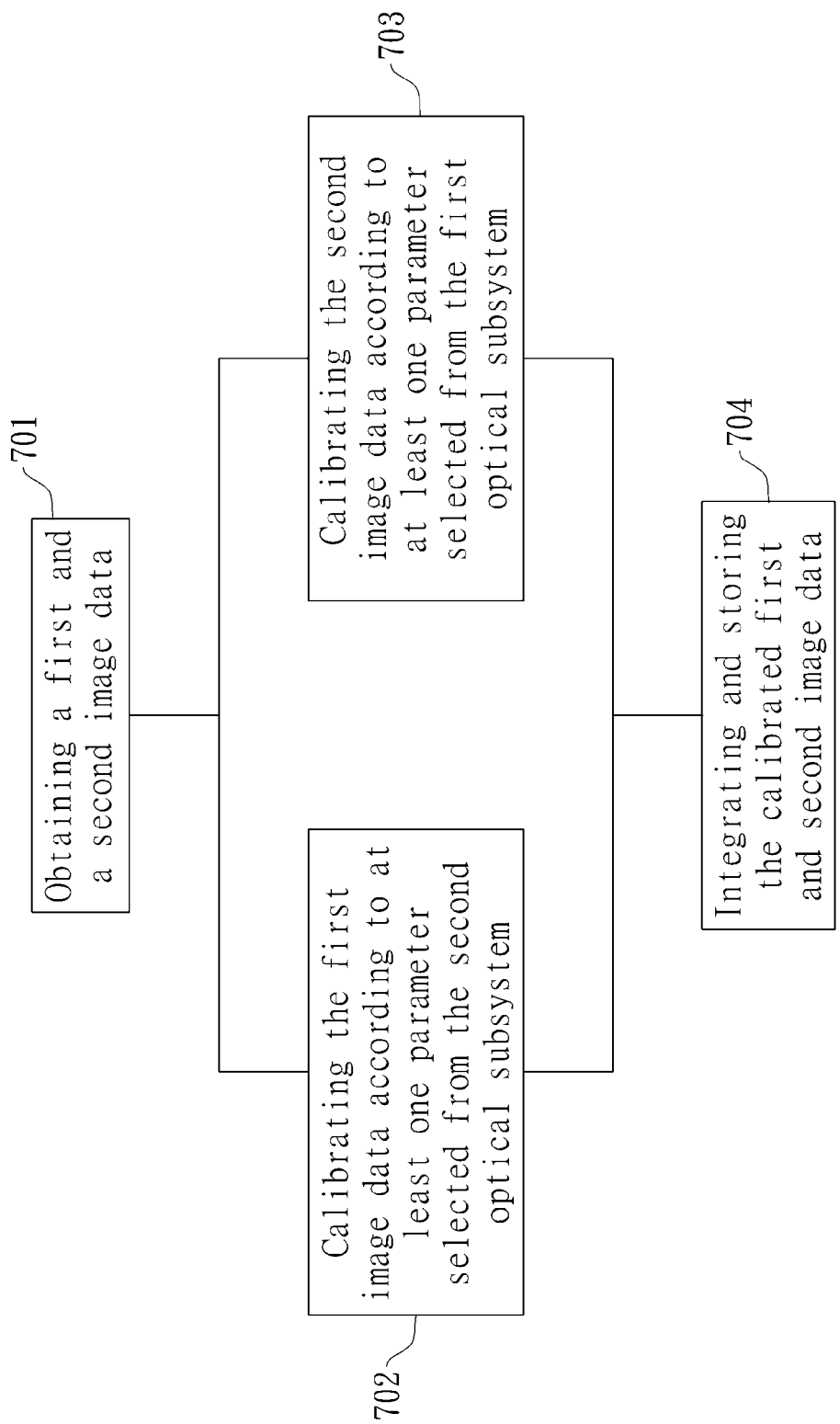
FIG. 7 is a flow chart showing the steps of a calibration method for optical imaging lens system with double optical paths according to the first embodiment of the present invention.

FIG. 7 is a flow chart showing the steps of a calibration method for optical imaging lens system with double optical paths. This calibration method is applicable to the calibration module 108 of the aforementioned embodiment. The calibration module 108 may be an image processing unit or a multifunctional unit.

In Step 701, the calibration module 108 receives a first image data from the first optical subsystem 101 and a second image data from the second optical subsystem 102. As described above, when the light from the first optical subsystem 101 is reflected by the optical path selector 103 and forms an image on the sensor 106, the sensor 106 obtains a first image. When the light from the second optical subsystem 102 passes through the optical path selector 103 and forms an image on the sensor 106, the sensor 106 obtains a second image. The sensor 106 outputs a first image data and a second image data according to the first image and the second image.

In Step 702, the calibration module 108 calibrates the first image data according to at least one selected parameter of the second optical subsystem 102. In Step 703, the calibration module 108 calibrates the second image data according to at least one selected parameter of the first optical subsystem 101. The calibration calculation of certain parameters of the first image data from the first optical subsystem 101 is made based on corresponding parameters of the second optical subsystem 102 while the calibration calculation of certain parameters of the second image data from the second optical subsystem 102 is made based on corresponding parameters of the first optical subsystem 101. The calibration calculation will not be performed on the parameters of the first image data from the first optical subsystem 101 on which the calibration calculation of certain parameters of the second image data is based; the calibration calculation will not be performed on the parameters of the second image data from the second optical subsystem 102 on which the calibration calculation of certain parameters of the first image data is based. In the present invention, an image coming from the first optical subsystem 101 and an image coming from the second optical subsystem 102 can be alternately recorded on the sensor 106 in a sequential order. Therefore, the calibration module 108 will calibrate the first image data from the first optical subsystem 101 and the second image data from the second optical subsystem 102 upon receiving them.

In Step 704, the calibration module 108 combines and stores the calibrated first and second image data. Generally, the modified first and second image data can be stored in an alternating order.

Figure 5B:
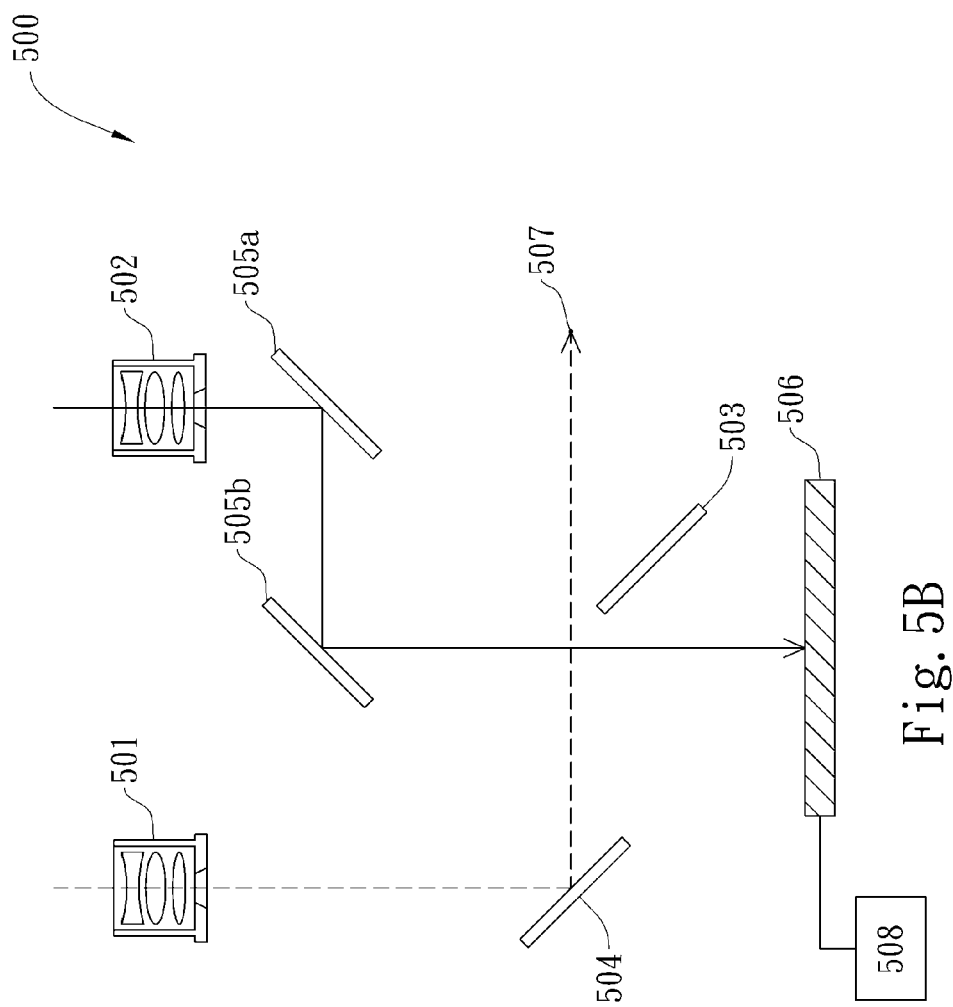
FIG. 5B illustrates a schematic view showing a calibration apparatus for optical imaging lens system with double optical paths according to the second embodiment of the present invention, wherein an image coming from the second optical subsystem is recorded.

FIG. 5A illustrates a schematic view showing a calibration apparatus 500 for optical imaging lens system with double optical paths according to a second embodiment of the present invention, wherein an image coming from the first optical subsystem 501 is recorded. FIG. 5B illustrates the calibration apparatus 500 according to the same embodiment of the present invention, wherein an image coming from the second optical subsystem 502 is recorded. In the second embodiment, a calibration apparatus 500 for optical imaging lens system with double optical paths comprises a first optical subsystem 501, a second optical subsystem 502, a movable optical path selector 503, a first reflector set 504, a second reflector set 505 (comprising two reflectors 505a and 505b), a sensor 506, and a calibration module 508. By a proper configuration of the first reflector set 504, the second reflector set 505 (comprising two reflectors 505a and 505b) and the movable optical path selector 503, the present invention enables a first image coming from the first optical subsystem 501 and a second image coming from the second optical subsystem 502 to be alternately recorded on the sensor 506 in a sequential order. The sensor 506 outputs a first image data and a second image data according to the first image and the second image. The calibration module 508 receives the first image data and the second image data from the sensor 506 and calibrates the first image data and the second image data to improve uniformity in images. The first optical subsystem 501 and the second optical subsystem 502 may be optical systems with conventional imaging lenses. The first reflector set 504 comprising one reflector is disposed at the image side of the first optical subsystem 501 for directing the light coming from the first optical subsystem 501. The second reflector set 505 (comprising two reflectors 505a and 505b) is disposed at the image side of the second optical subsystem 502 for directing the light coming from the second optical subsystem 502. Moreover, the configuration of the first reflector set 504 and the second reflector set 505 (comprising two reflectors 505a and 505b) allows the optical path of the first optical subsystem 501 and the optical path of the second optical subsystem 502 to intersect. The movable optical path selector 503 comprises a reflector for reflecting the light from the first optical subsystem 501 or the light from the second optical subsystem 502. In this embodiment, when the movable optical path selector 503 is disposed at the position where the optical path of the first optical subsystem 501 and the optical path of the second optical subsystem 502 intersect, the light from the first optical subsystem 501 is reflected by the movable optical path selector 503 and further forms an image on the sensor 506, while the light from the second optical subsystem 502 is reflected by the movable optical path selector 503 and further forms an image on another position 507 rather than on the sensor 506. When the movable optical path selector 503 is disposed at the position other than the optical paths of the first optical subsystem 501 and the second optical subsystem, or the intersection of the two subsystems, the light from the second optical subsystem 502 forms an image on the sensor 506 while the light from the first optical subsystem 501 forms an image on another position 507 rather than on the sensor 506.

FIG. 5A illustrates a schematic view showing a calibration apparatus 500 for optical imaging lens system with double optical paths according to the second embodiment of the present invention, wherein an image coming from the first optical subsystem 501 is recorded. In FIG. 5A, the optical path of the first optical subsystem 501 is shown in solid lines, while the optical path of the second optical subsystem 502 is shown in dashed lines. The movable optical path selector 503 is disposed at the position where the optical path of the first optical subsystem 501 and the optical path of the second optical subsystem 502 intersect. After the first optical subsystem 501 receives the light from an object (not shown) to be imaged, the light from the first optical subsystem 501 is reflected by the first reflector set 504 and directed to the movable optical path selector 503. As a result, the light from the first optical subsystem 501 is further reflected by the movable optical path selector 503 and forms a first image on the sensor 506. The first image is recorded on the sensor 506 upon its formation.

On the other hand, after the second optical subsystem 502 receives the light from an object (not shown) to be imaged, the light from the second optical subsystem 502 is reflected by the second reflector set 505 comprising two reflectors 505a and 505b and directed to the movable optical path selector 503. As a result, the light from the second optical subsystem 502 is further reflected by the movable optical path selector 503 and forms an image on another position 507 rather than on the sensor 506.

FIG. 5B illustrates a schematic view showing a calibration apparatus 500 for optical imaging lens system with double optical paths according to the second embodiment of the present invention, wherein an image coming from the second optical subsystem 502 is recorded. In FIG. 5B, the optical path of the first optical subsystem 501 is shown in dashed lines, while the optical path of the second optical subsystem 502 is shown in solid lines. The movable optical path selector 503 is disposed at the position other than the optical paths of the first optical subsystem 501 and the second optical subsystem 502, or the intersection of the two subsystems. After the first optical subsystem 501 receives the light from an object (not shown) to be imaged, the light from the first optical subsystem 501 is reflected by the first reflector set 504 and directed to another position 507 rather than to the sensor 506. On the other hand, after the second optical subsystem 502 receives the light from an object (not shown) to be imaged, the light from the second optical subsystem 502 is reflected by the second reflector set 505 comprising two reflectors 505a and 505b, directed to the sensor 506 and forms a second image thereon. The second image is recorded on the sensor 506 upon its formation.

It can be seen from the above that, the first optical subsystem 501 and the second optical subsystem 502 of a calibration apparatus for optical imaging lens system with double optical paths according to the present invention have equal back focal lengths, so that light from both the first optical subsystem 501 and the second optical subsystem 502 can form clear images on the sensor 506. In a calibration apparatus for optical imaging lens system with double optical paths of the present invention, the cycle that the movable optical path selector 503 changes its position and the cycle that the sensor 506 is exposed to light can be synchronized by adjusting the moving speed of the movable optical path selector 503. By synchronizing the two cycles, an image coming from the first optical subsystem 501 and an image coming from the second optical subsystem 502 can be alternately recorded on the sensor 506 in a sequential order.

FIG. 7 shows the steps of a calibration method for optical imaging lens system with double optical paths of the present invention. This calibration method is applicable to the calibration module 508 of the aforementioned embodiment.

In Step 701, the calibration module 508 receives a first image data from the first optical subsystem 501 and a second image data from the second optical subsystem 502. As described above, when the light from the first optical subsystem 501 is reflected by the optical path selector 503 and forms an image on the sensor 506, the sensor 506 obtains a first image. When the light from the second optical subsystem 502 passes through the optical path selector 503 and forms an image on the sensor 506, the sensor 506 obtains a second image. The sensor 506 outputs a first image data and a second image data according to the first image and the second image.

In Step 702, the calibration module 508 calibrates the first image data according to at least one selected parameter of the second optical subsystem 502. In Step 703, the calibration module 508 calibrates the second image data according to at least one selected parameter of the first optical subsystem 501. The calibration calculation of certain parameters of the first image data from the first optical subsystem 501 is made based on corresponding parameters of the second optical subsystem 502 while the calibration calculation of certain parameters of the second image data from the second optical subsystem 502 is made based on corresponding parameters of the first optical subsystem 501. The calibration calculation will not be performed on the parameters of the first image data from the first optical subsystem 501 on which the calibration calculation of certain parameters of the second image data is based; the calibration calculation will not be performed on the parameters of the second image data from the second optical subsystem 502 on which the calibration calculation of certain parameters of the first image data is based. In this embodiment, an image coming from the first optical subsystem 501 and an image coming from the second optical subsystem 502 can be alternately recorded on the sensor 506 in a sequential order. Therefore, the calibration module 508 will calibrate the first image data from the first optical subsystem 501 and the second image data from the second optical subsystem 502 upon receiving them.

In Step 704, the calibration module 508 combines and stores the calibrated first and second image data. Generally, the calibrated first and second image data can be stored in an alternating order.

Figure 6:
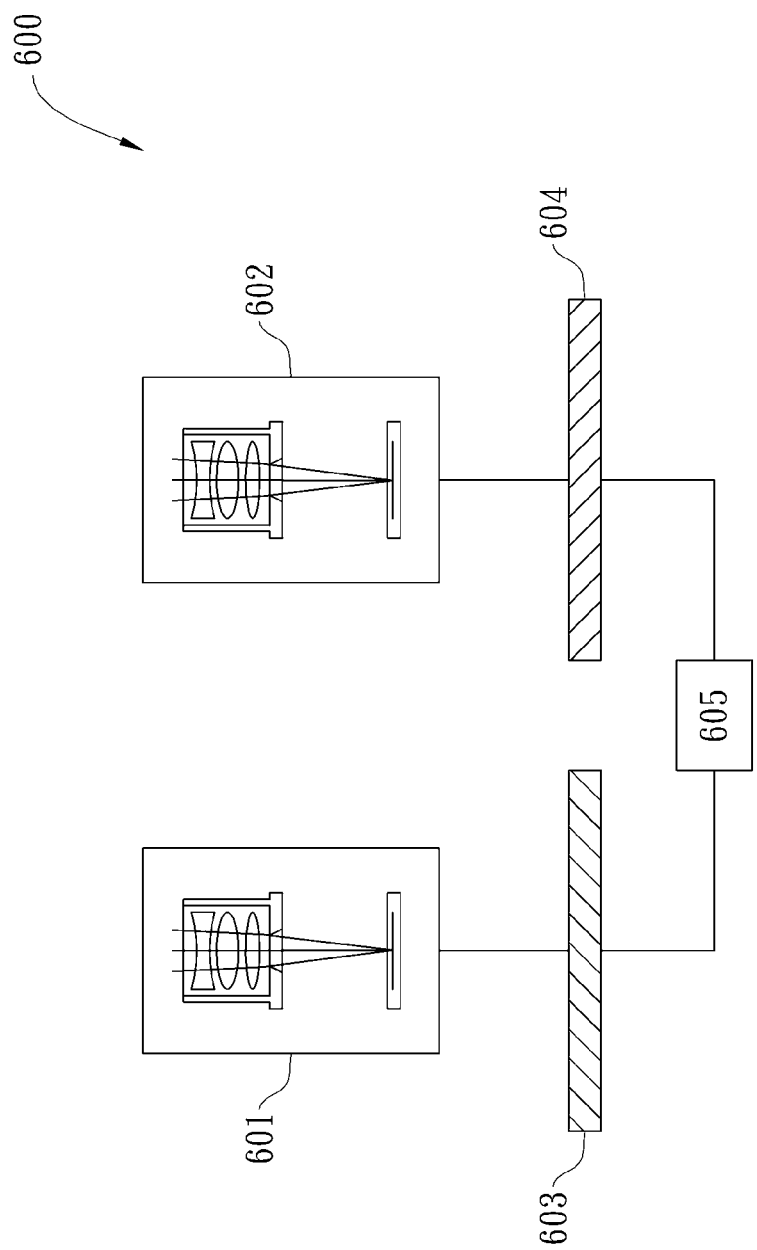
FIG. 6 illustrates a schematic view showing a calibration apparatus for optical imaging lens system with double optical paths according to a third embodiment of the present invention.

FIG. 6 illustrates a schematic view showing a calibration apparatus 600 for optical imaging lens system with double optical paths according to a third embodiment of the present invention. In the third embodiment, the calibration apparatus 600 for optical imaging lens system with double optical paths comprises a first optical system 601, a second optical system 602, a first sensor 603, a second sensor 604, and a calibration module 605. A first image coming from the first optical system 601 and a second image coming from the second optical system 602 can be recorded on the first sensor 603 and the second sensor 604, respectively. The first sensor 603 outputs a first image data according to the first image, and the second sensor 604 outputs a second image data according to the second image. The calibration module 605 receives the first image data output by the first sensor 603 and the second image data output by the second sensor 604 and calibrates the first and the second image data to improve uniformity in images.

The first optical system 601 and the second optical system 602 may be optical systems with conventional imaging lenses; they are used for receiving the light coming from an object (not shown) to be imaged. After the first optical system 601 receives the light from an object to be imaged, the light from the first optical system 601 is projected to the first sensor 603 and forms a first image thereon. The first image is recorded on the first sensor 603 upon its formation. On the other hand, after the second optical system 602 receives the light from an object (not shown) to be imaged, the light from the second optical system 602 is projected to the second sensor 604 and forms a second image thereon. The second image is recorded on the second sensor 604 upon its formation.

Figure 8:
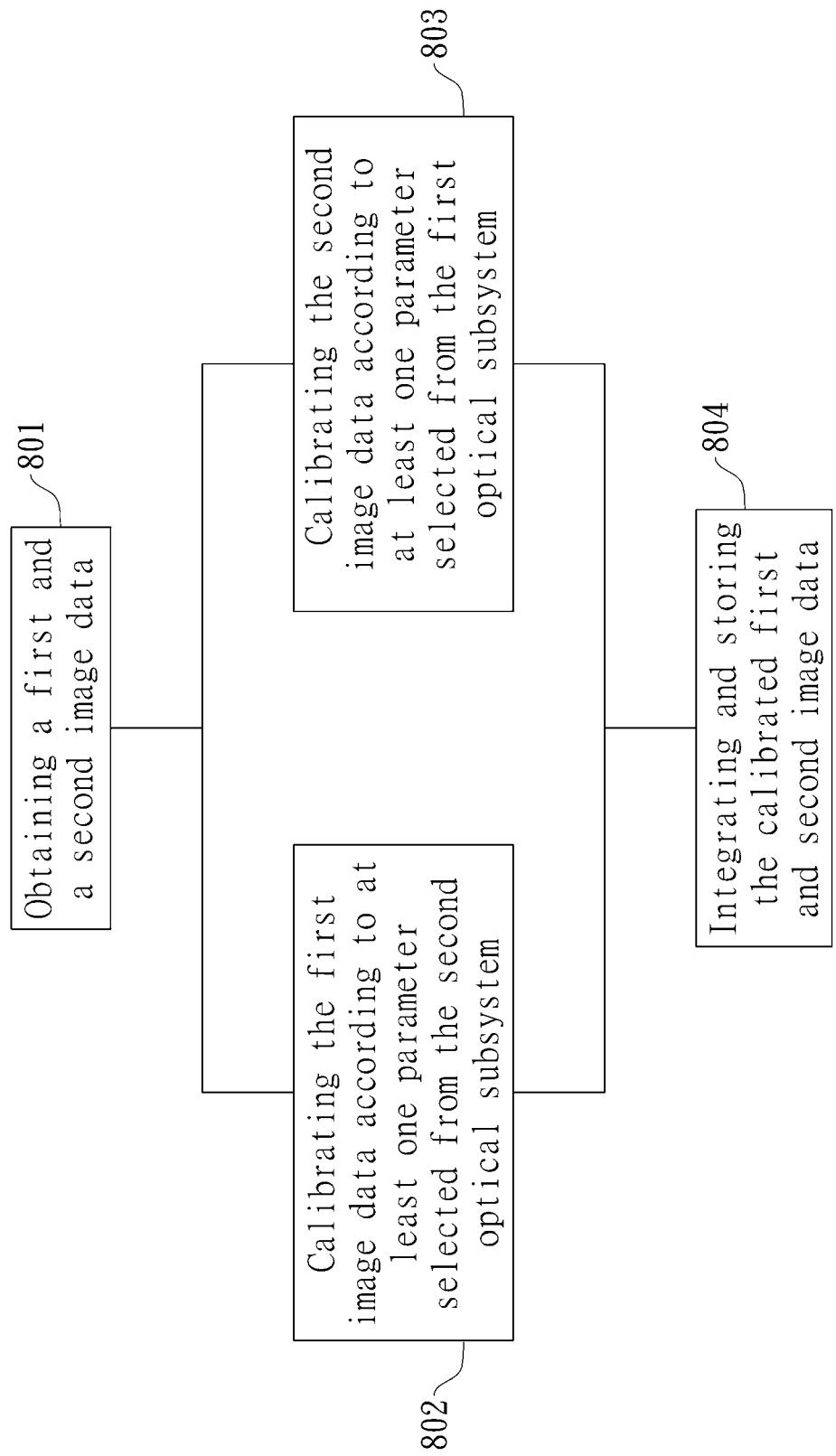
FIG. 8 is a flow chart showing the steps of a calibration method for optical imaging lens system with double optical paths according to another embodiment of the present invention.

FIG. 8 is a flow chart showing the steps of a calibration method for optical imaging lens system with double optical paths according to another embodiment of the present invention. This calibration method is applicable to the calibration module 605 of the aforementioned embodiment.

In Step 801, the calibration module 605 receives a first image data from the first optical system 601 and a second image data from the second optical system 602. As described above, when the light from the first optical system 601 forms an image on the first sensor 603, the first sensor 603 obtains a first image data. When the light from the second optical system 602 forms an image on the second sensor 604, the second sensor 604 obtains a second image data.

In Step 802, the calibration module 605 calibrates the first image data according to at least one selected parameter of the second optical system 602. In Step 803, the calibration module 605 calibrates the second image data according to at least one selected parameter of the first optical system 601. The calibration calculation of certain parameters of the first image data from the first optical system 601 is made based on corresponding parameters of the second optical system 602 while the calibration calculation of certain parameters of the second image data from the second optical system 602 is made based on at least one parameter of the first optical system 601. The calibration calculation will not be performed on the parameters of the first image data from the first optical system 601 on which the calibration calculation of certain parameters of the second image data is based; the calibration calculation will not be performed on the parameters of the second image data from the second optical system 602 on which the calibration calculation of certain parameters of the first image data is based. In this embodiment, an image coming from the first optical system 601 and an image coming from the second optical system 602 can be recorded on the first sensor 603 and the second sensor 604, respectively. Therefore, the calibration module 605 can calibrate a first image data from the first optical system 601 and a second image data from the second optical system 602 simultaneously. Alternatively, the calibration module 605 calibrates the first image data from the first optical system 601 and the second image data from the second optical system 602 in an alternating order.

In Step 804, the calibration module 605 combines and stores the calibrated first and second image data. Generally, the calibrated first and second image data are stored in an alternating order.

In the aforementioned embodiments of the present invention, the parameters of the optical subsystem or optical system may be the distortion parameter, the lateral magnification parameter, the contrast parameter, the image surface illumination parameter, etc. It should be noted that the parameters adopted in a calibration method for optical imaging lens system with double optical paths of the present invention are not limited to those listed above. The parameters of any optical image can be parameters of the optical subsystem and optical system of the present invention.

Figure 9:
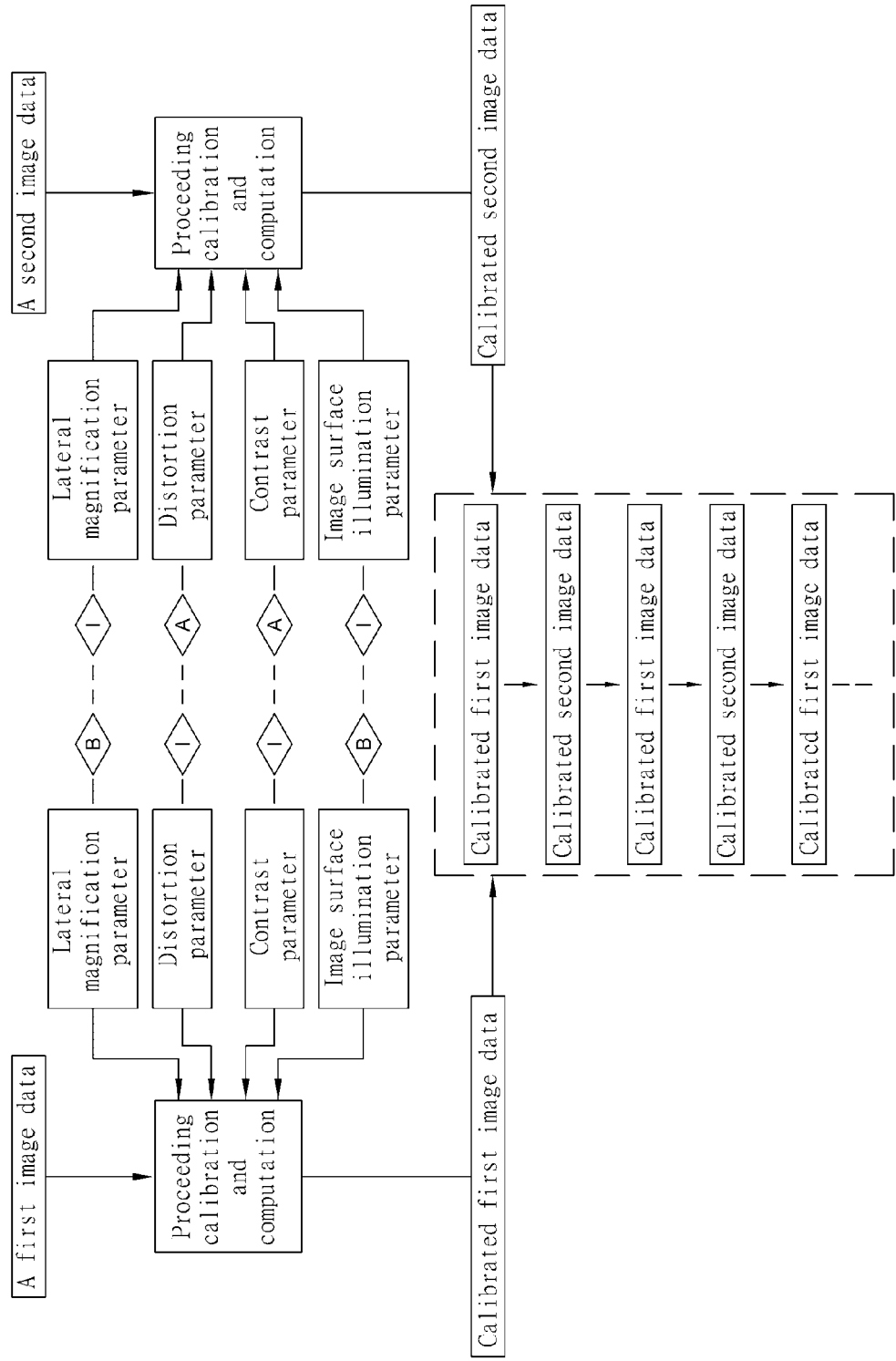
FIG. 9 is a schematic view showing a calibration method for optical imaging lens system with double optical paths of the present invention adopting the distortion parameter, lateral magnification parameter, contrast parameter and image surface illumination parameter.

FIG. 9 is a schematic view showing how a calibration method for optical imaging lens system with double optical paths of the present invention adopting the distortion parameter, the lateral magnification parameter, the contrast parameter and the image surface illumination parameter is performed. In this embodiment, the distortion parameter and the contrast parameter of the optical subsystem A serve as criteria while the lateral magnification parameter and the image surface illumination parameter of the optical subsystem B serve as criteria. Therefore, the calibration calculation of the lateral magnification parameter and the image surface illumination parameter of the first image data from the optical subsystem A is made based on the lateral magnification parameter and the image surface illumination parameter of the optical subsystem B, but the calibration calculation will not be performed on the distortion parameter and the contrast parameter of the first image data from the optical subsystem A. On the other hand, the calibration calculation of the distortion parameter and the contrast parameter of the second image data from the optical subsystem B is made based on the distortion parameter and the contrast parameter of the optical subsystem A, but the calibration calculation will not be performed on the lateral magnification parameter and the image surface illumination parameter of the second image data from the optical subsystem B. The calibrated first and second image data will then be further integrated or alternately stored to form a single image data.

The lateral magnification means the lateral magnifying power; the contrast magnification means the black and white contrast magnifying power; the image surface illumination means the ratio of brightness on the central part to that on the periphery of the image. Generally, the calibration calculation is performed on the parameters of both optical subsystems that may lead to inferior image quality, thereby the image quality can be maintained.

In the present invention, the selection of parameters from the two optical subsystems can be made by comparing the images of an object or a test board taken by the two optical subsystems under the same conditions. While this invention has been described by way of examples and in terms of preferred embodiments, it is to be understood that this invention is not limited hereto, and that various changes, substitutions, and alterations can be made herein without departing from the spirit and scope of this invention as defined by the appended claims.

What is claimed is:

1. An apparatus for optical imaging lens system with multiple optical paths, comprising:
   a first optical subsystem;
   a second optical subsystem having a back focal length equal to that of the first optical subsystem;
   an optical path selector selectively having a light reflection state and a light passing state;
   a first reflector set disposed at an image side of the first optical subsystem for directing the light from the first optical subsystem to the optical path selector;
   a second reflector set disposed at an image side of the second optical subsystem for directing the light from the second optical subsystem to the optical path selector;
   a sensor for obtaining a first image data from an image coming from the first optical subsystem and a second image data from an image coming from the second optical subsystem in a sequential or alternating order; and
   a calibration module for receiving the first image data and the second image data from the sensor; wherein the calibration module calibrates the first image data according to at least one selected optical parameter of the second optical subsystem and calibrates the second image data according to at least one selected optical parameter of the first optical subsystem, the selected optical parameters of the first optical subsystem and the second optical subsystem being different so that the calibrated first and second image data are alternately stored and have an inter-compensated relationship; wherein when the optical path selector is in the light reflection state, the light from the first optical subsystem forms an image on the sensor while the light from the second optical subsystem forms an image on another position rather than on the sensor; and wherein when the optical path selector is in the light passing state, the light from the second optical subsystem forms an image on the sensor while the light from the first optical subsystem forms an image on another position rather than on the sensor.

2. The apparatus for optical imaging lens system with multiple optical paths according to claim 1, wherein the light traveling along an optical axis of the first optical subsystem and the light traveling along an optical axis of the second optical subsystem are projected to the same position on the sensor.

3. The apparatus for optical imaging lens system with multiple optical paths according to claim 1, wherein a cycle that the optical path selector changes its state synchronizes with a cycle that the sensor is exposed to light.

4. The apparatus for optical imaging lens system with multiple optical paths according to claim 1, wherein the optical parameters of the first optical subsystem and the second optical subsystem include parameters from lateral magnification, distortion, contrast and image surface illumination.

5. A calibration method for optical imaging lens system with multiple optical paths, comprising the steps of:
   receiving a first image data from a first optical subsystem and a second image data from a second optical subsystem;
   calibrating the first image data according to at least one selected optical parameter of the second optical subsystem; and
   calibrating the second image data according to at least one selected optical parameter of the first optical subsystem;
   wherein the selected optical parameters of the first optical subsystem and the second optical subsystem are different; and
   wherein the calibrated first and second image data are alternately stored and have an inter-compensated relationship.

6. The calibration method for optical imaging lens system with multiple optical paths according to claim 5, wherein the optical parameters of the first optical subsystem and the second optical subsystem include parameters from lateral magnification, distortion, contrast and image surface illumination.

* * * * *